(12) United States Patent
Tröllsch

(10) Patent No.: US 12,326,400 B2
(45) Date of Patent: *Jun. 10, 2025

(54) MEASURING DEVICE FOR MEASURING THE ABSORPTION OF GASES

(71) Applicant: DRÄGER SAFETY AG & CO. KGAA, Lübeck (DE)

(72) Inventor: Arne Tröllsch, Lübeck (DE)

(73) Assignee: DRÄGER SAFETY AG & CO. KGAA, Lübeck (DE)

(*) Notice: Subject to any disclaimer, the term of this patent is extended or adjusted under 35 U.S.C. 154(b) by 246 days.

This patent is subject to a terminal disclaimer.

(21) Appl. No.: 17/673,362

(22) Filed: Feb. 16, 2022

(65) Prior Publication Data

US 2022/0170851 A1 Jun. 2, 2022

Related U.S. Application Data

(63) Continuation of application No. 16/327,058, filed as application No. PCT/EP2017/000980 on Aug. 16, 2017, now Pat. No. 11,385,172.

(30) Foreign Application Priority Data

Aug. 23, 2016 (DE) ...................... 10 2016 010 088.5

(51) Int. Cl.
*G01N 21/3504* (2014.01)
*G01N 21/03* (2006.01)
*G01N 21/31* (2006.01)

(52) U.S. Cl.
CPC ....... *G01N 21/3504* (2013.01); *G01N 21/031* (2013.01); *G01N 2021/3137* (2013.01); *G01N 2201/066* (2013.01)

(58) Field of Classification Search
CPC ............ G01N 21/031; G01N 21/3504; G01N 2021/3137; G01N 2201/066
USPC .................................................. 356/432–448
See application file for complete search history.

(56) References Cited

U.S. PATENT DOCUMENTS

| 11,385,172 B2 * | 7/2022 | Tröllsch | G01N 21/031 |
| 2007/0279633 A1 * | 12/2007 | Yi | G01N 21/61 356/432 |
| 2017/0241904 A1 * | 8/2017 | Barritault | G01J 3/42 |
| 2017/0322149 A1 * | 11/2017 | Pape | G01N 21/1702 |

* cited by examiner

*Primary Examiner* — Tri T Ton
(74) *Attorney, Agent, or Firm* — McGlew and Tuttle, P.C.

(57) ABSTRACT

A measuring device is provided for measuring the absorption of gases. The measuring device (1) includes a radiation source (2), a first detector element (3), a second detector element (9) and a reflector array (4). The reflector array (4) defines a first optical path (5) between the radiation source (2) and the first detector element (3) and defines a second optical path (10) between the radiation source (2) and the second detector element (9). The first optical path (5) has at least two points of intersection with itself and the second detector element (9) is arranged outside of a first plane which is defined by the radiation source (2) and two points of intersection (6) of the first optical path (5).

20 Claims, 2 Drawing Sheets

MEASURING DEVICE FOR MEASURING THE ABSORPTION OF GASES

CROSS REFERENCE TO RELATED APPLICATIONS

This application is a continuation under 37 CFR 1.53(b) of pending prior U.S. patent application Ser. No. 16/327,058 filed Feb. 21, 2019, which claims the benefit (35 U.S.C. § 120 and 365(c)) of International Application PCT/EP2017/000980 filed Aug. 16, 2017, which designated inter alia the United States and which claims the priority of German Patent Application DE 10 2016 010 088.5 filed Aug. 23, 2016, the entire contents of each application are incorporated herein by reference.

TECHNICAL FIELD

The present invention pertains to a measuring device for measuring the absorption of gases, the measuring device comprising a radiation source, a first detector element, a second detector element and a reflector array, which defines a first optical path between the radiation source and the first detector element and a second optical path between the radiation source and the second detector element.

TECHNICAL BACKGROUND

Gas sensors, which determine the absorption of electromagnetic radiation in the respective gas, are used for the quantitative determination of gas concentrations of, e.g., carbon dioxide or methane in air. The species of the gas and the concentration thereof can be inferred on the basis of the quantity and the wavelength of the absorbed electromagnetic radiation. In this case, the gas sensors may be optical gas sensors, which have a light source, an optical cuvette, in which the gas to be measured is located, and one or a plurality of detectors, which detect the light of the measurement wavelength and of the reference wavelength by means of optical bandpass filters. It is possible to determine the gas concentration by means of a comparison between the reference radiation and the measurement radiation, which detects the absorbed portions of the electromagnetic radiation.

Gas sensors which use light bulbs as light sources are known. U.S. Pat. No. 6,469,303 B1 as well as U.S. Pat. No. 6,989,549 B2 describe a sensor in a cylindrical metallic housing. A light source and detectors are arranged within the housing. The gas is irradiated by the light of the light source. The radiation is then guided onto the detectors via the reflection at the metallic walls of the cylinder.

A drawback of the above-mentioned devices is that light bulbs are very energy-intensive to operate and can only be modulated slowly. Therefore, they can only be operated at low frequencies. Light bulbs further have the drawback that they are sensitive to mechanical vibration, since the filament can then tear.

Using an LED as light source, wherein the radiation of the LED is guided via a plurality of concave mirrors and a plurality of plane mirrors through a measuring cuvette and onto a detector, is known from U.S. Pat. No. 9,234,837 B2. The plane mirrors and the concave mirrors are in this case each arranged opposite one another on different sides of the measuring cuvette, so that the light beams travel a zig-zag-shaped path through the measuring cuvette.

A sensor array, which uses an LED as light source, is known from US 2009/0235720 A1. The light passes through the gas to be measured and then reaches a hemispherical mirror, which then focuses the light onto the detector.

All of the above-mentioned devices have the drawback that the optical device used in each case is inefficient, since very large sensors are necessary for weakly absorbing gases in order to reach the necessary absorption wavelengths.

Devices, in which longer absorption paths are achieved due to multiple reflections, so that weakly absorbing gases can also be detected with smaller sensors, are known from DE 2504300 A1 and DE 10124055 A1.

SUMMARY

An object of the present invention is to provide an alternative measuring device for measuring the absorption of gases which has a small size and a low energy consumption, and has a mechanically robust configuration.

A measuring device, for measuring the absorption of gases comprises a radiation source, a first detector element, a second detector element and a reflector array. The reflector array defines a first optical path between the radiation source and the first detector element and a second optical path between the radiation source and the second detector element. The first optical path here has at least two points of intersection with itself. According to the present invention, provisions are made for the second detector element to be arranged outside of a first plane defined by the radiation source and two points of intersection of the first optical path.

Because the second detector element is arranged outside of the first plane defined by the radiation source and two points of intersection of the first optical path, a greater flexibility is obtained in the arrangement of the detector elements and the radiation source, for example, on a common circuit board. This supports a compact construction of the measuring device, especially when more than two detector elements are used. For example, a third detector element can be arranged in the first plane together with the first detector element and the radiation source. The second detector element and third detector element can then be selectively used for reference measurements. In addition, this arrangement of the second detector element makes possible the clear separation of the detector elements, so that the detector in question is easily accessible during maintenance or in the event of a defect.

The reflector array is configured such that at least one multiple irradiation of the gas volume thereof with the measuring radiation is brought about by means of the first optical path. In this connection, a point of intersection of the optical path is defined as a crossing of different sections of the optical path, which crossing has an angle different from 0° or 360° and from the integral multiples thereof. In this case, the measuring radiation passes through the volume of gas to be measured multiple times overall before the measuring radiation reaches the first detector element. As a result, the absorption path length, in weakly absorbing gases, is multiplied. Due to the intersection of the optical path with itself, the volume of gas to be measured is limited to a minimum in this case. Consequently, the entire optical path is provided within a very small volume. In the measured volume, the optical path is folded by the reflector array in a manner intersecting itself. Due to the folding of the optical path, the angles of incidence of the measuring radiation at the reflector array are small. The measuring device is thus extremely compact and can, furthermore, be operated efficiently, since water films on the optical devices, due to the small angles of incidence, have only a minimal influence on the intensity of the electrical radiation. Further, the device is highly insensitive to vibrations, since the optical elements have a simple configuration and are grouped together in a small space.

The first optical path advantageously comprises at least three, preferably at least four, preferably at least five, and especially preferably six, points of intersection with itself. The higher the number of points of intersection, the more times the measuring radiation will pass through the measured volume. Further, a higher number of points of intersection means that the measuring device may have smaller dimensions than with a lower number of points of intersection. The compactness of the measuring device as well as the advantage of the more effective manufacture of the measuring device may be further enhanced in this manner.

Just like the first optical path, the second optical path may have two or more points of intersection with itself. The statements made concerning the first optical path then correspondingly apply to the second optical path.

The measuring device advantageously comprises a measuring chamber with a wall element which encloses the measuring chamber, wherein the radiation source, the first detector element, the second detector element and the reflector array are arranged at the wall element. This makes possible a simple structural shape and simplifies the formation of small angles of incidence at the reflector array.

It is further advantageous when the second optical path has no point of intersection with itself The second optical path is thus shorter than the first optical path. Thus, the second optical path has a short absorption path in the gas to be measured, with which strongly absorbing gases can be measured. The combination of the first optical path and the second optical path in the measuring device makes possible the simultaneous measurement of weakly and strongly absorbing gases. Weakly absorbing gases are then analyzed by means of the first optical path and strongly absorbing gases are then analyzed by means of the second optical path. Measurements, of two gases with different absorption intensities, in a compact gas volume, can be carried out simultaneously with the measuring device. For example, methane and carbon dioxide can be measured simultaneously. Further, different concentration ranges of the same gas can be measured. In this case, the first optical path can be used for measuring, e.g., methane in the concentration range of 0 vol. % to 5 vol. % and the second optical path can be used for measuring methane in the concentration range of 5 vol. % to 100 vol. %. This saves space and costs, since one and the same measuring device can be used for a plurality of gases. The first detector element and the second detector element may have a one-piece configuration here, and different areas of an overall detector may define the first detector element and the second detector element.

The reflector array advantageously has two mirror elements as well as a first concave mirror element and a second concave mirror element for the first optical path, wherein a first focus of the reflector array is arranged on the radiation source and a second focus of the reflector array is arranged on the first detector element, wherein the first concave mirror element and the second concave mirror element are preferably parabolic. The mirror elements are arranged here such that they reflect the light of one concave mirror element onto the corresponding other mirror element. In this way, the optical elements of the reflector array may consist of simple components that can be manufactured in a cost-effective manner. Further, the optical path can be calculated and fixed with these elements in a comparatively simple manner.

The reflector array advantageously has, in the second optical path, a third concave mirror element, which images the radiation source onto the second detector element. The second optical path, which runs, for example, from the radiation source to the third concave mirror element and from the third concave mirror element to the second detector element, is defined by the third concave mirror element. In this case, there are no points of intersection in the second optical path, so that the measuring radiation will pass through the volume of gas to be measured on the second optical path only twice. Strongly absorbing gases can be measured with such a second optical path.

The third concave mirror element is advantageously arranged between the first concave mirror element and the second concave mirror element. In order to reflect from the first plane, the third concave mirror element may be sloped towards the first plane. As an alternative or in addition, the third concave mirror element may have an asymmetric shape. The third concave mirror element may preferably have a smaller configuration than the first concave mirror element and the second concave mirror element for measuring strongly absorbing gases, since the second optical path also only needs a small radiation cross section because of the strong absorption in case of only a single reflection. This arrangement saves space, so that a further increase in the compactness of the measuring device is achieved.

In an alternative embodiment, the third concave mirror element, the first concave mirror element and the second concave mirror element are arranged in a triangle. This arrangement makes possible a modular configuration of the measuring device. In this case, a module with the second detector element and the third concave mirror element can be connected to a measuring device, which defines the first optical path and is suitable for measuring, for example, a weakly absorbing gas. Additional gases or gas concentrations can then be detected by means of the module.

An optical filter element is advantageously arranged between the measuring chamber and the first detector element and/or second detector element. A portion of the spectrum emitted by the radiation source is selected by means of the filter element for the determination of the gas concentration. The filter element is coordinated here with the respective gas to be measured.

The measuring chamber advantageously has a height between 3 mm and 12 mm, preferably 6 mm, and has a diameter between 9 mm and 36 mm, preferably 18 mm. These dimensions are very compact and there is high stability.

It is further advantageous when the wall element has a pentagonal or hexagonal inner cross section in a plane, in which the first optical path runs. The assembly of the reflector array, of the radiation source and of the detector elements is simplified by means of this cross section. Further, the fixing of optical paths is facilitated by this cross section.

The present invention is explained in more detail on the basis of advantageous exemplary embodiments by means of the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1A:
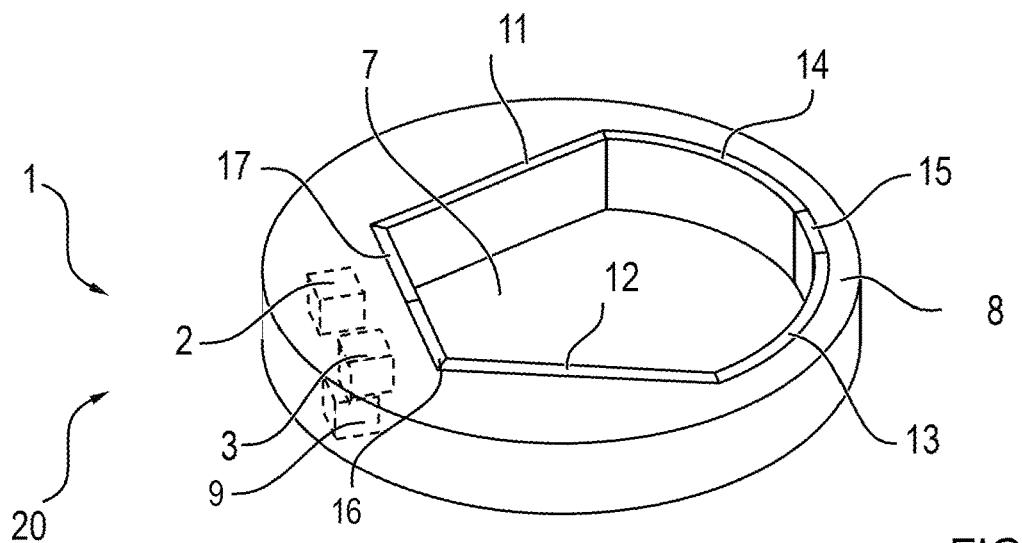
FIG. 1a is a schematic perspective view of a first embodiment of a measuring device for measuring the absorption of at least one weakly absorbing gas and at least one strongly absorbing gas.

Referring to the drawings, a measuring device for measuring the absorption of gases is referenced below in its entirety with the reference number 1. According to FIGS. 1a, 1b and 1c, the measuring device 1 comprises a wall element 8, which defines a measuring chamber 7 having a hexagonal cross section. The wall element 8 forms a pipe with a hexagonal inner cross section in this case.

A radiation source 2 as well as a first detector element 3 and a second detector element 9 are arranged at the wall element 8. In this case, the radiation source 2, the first detector element 3 and the second detector element 9 are arranged on one side of the hexagonal inner cross section of the wall element 8. The radiation source 2 emits electromagnetic radiation into the measuring chamber 7. The first detector element 3 and the second detector element 9 detect electromagnetic radiation, which is emitted from the measuring chamber 7. On the other five sides of the inner cross section of the wall element 8 are arranged a first mirror element 11 and a second mirror element 12 as well as a first concave mirror element 13, a second concave mirror element 14 and a third concave mirror element 15. The third concave mirror element 15 is arranged between the first concave mirror element 13 and the third concave mirror element 14.

Arranged between the measuring chamber 7 and the first detector element 3 is a first optical filter element 16, which only passes through a defined wavelength range of the electromagnetic radiation. A second optical filter element 18, which likewise only passes through a defined wavelength range of the electromagnetic radiation, is arranged between the measuring chamber 7 and the second detector element 9. In this case, the first optical filter element 16 can filter a different range out of the measured radiation than the second optical filter element 18. For the sake of clarity, the second optical filter element 18 is not shown in FIGS. 1a and 1b.

The radiation source emits over a broad band and is arranged behind a transparent element 17 which has no filtering action at least in the wavelength ranges to be detected by the first detector element and the second detector element 3, 9.

In one embodiment, not shown, the wall element 8 can have a flattened configuration, preferably an essentially flat configuration on the side of the optical filter elements 16, 18 and of the transparent element 17 facing the radiation source 2 and the detector elements 3, 9. In this way, the radiation source 2 and the detector elements 3, 9 can be arranged on a common circuit board and be arranged behind the optical filter elements 16, 18 and the transparent element 17 at the wall element 8. The wall element 8 then has a common opening or an opening for the electromagnetic radiation in the area of each of the optical filter elements 16, 18 and of the transparent element 17. The optical filter elements 16, 18 as well as the transparent element 17 may also be fixed together with the detector elements 3, 9 and the radiation source 2 on the circuit board and be arranged in the opening or in the openings.

Figure 1B:
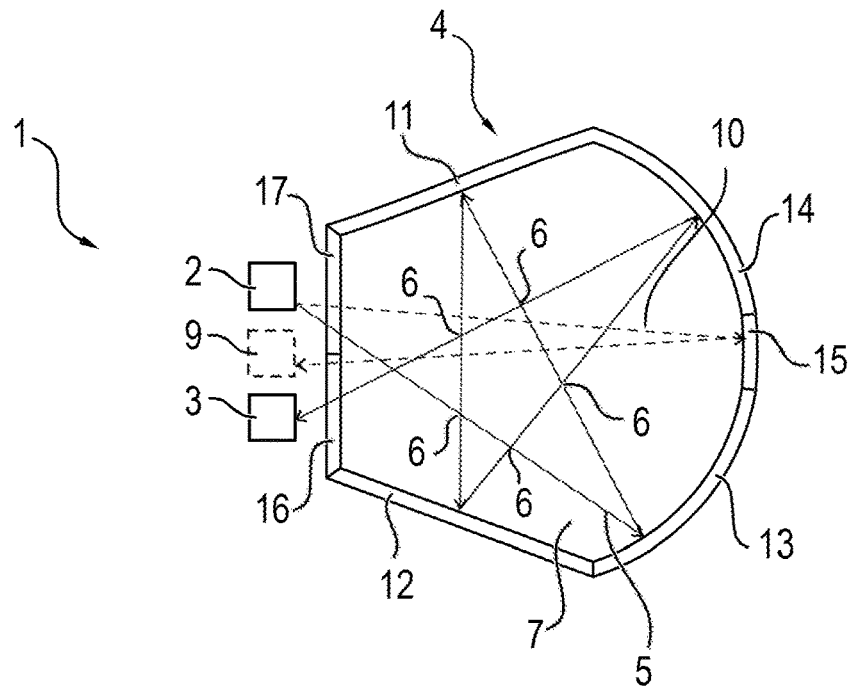
FIG. 1b is a schematic top view of the first embodiment of the measuring device with the wall element omitted.

As is seen especially in FIG. 1b, the measuring device 1 has a mirror-symmetric configuration in a first plane. The first plane is defined here by the radiation source 2 and two points of intersection 6 of a first optical path 5 running from the radiation source 2 to the first detector element 3. A plane of symmetry runs such that the radiation source 2 is imaged onto the first detector element 3, the transparent element 17 is imaged onto the first optical filter element 16, the first mirror element 11 is imaged onto the second mirror element 12, the first concave mirror element 13 is imaged onto the second concave mirror element 14 and the third concave mirror element 15 is imaged onto itself.

The transparent element 17 and the first optical filter element 16 are components on one side of the hexagon. The two sides of the hexagon adjacent to the transparent element 17 and the first optical filter element 16, respectively, are occupied by the mirror element 11 and the mirror element 12, respectively. The second concave mirror element 14 and the first concave mirror element 13 are arranged opposite the transparent element 17 and the first optical filter element 16, respectively.

The first concave mirror element 13 is focused onto the radiation source 2, i.e., electromagnetic radiation, which is emitted by the radiation source 2 and reaches the concave mirror element 13, is collimated by the concave mirror element 13, i.e., the concave mirror element 13 parallelizes the radiation originating from the radiation source 2.

The focus of the second concave mirror element 14 is directed towards the first detector element 3. Electromagnetic radiation that reaches the second concave mirror element 14, parallel to the optical axis of the second concave mirror element 14, is therefore focused onto the first detector element 3.

FIG. 1b shows the first optical path 5 running in the first plane for a beam from the radiation source 2. In this case, the mirror elements 11, 12 as well as the concave mirror elements 13, 14, 15 form a reflector array 4. The reflector array 4 guides electromagnetic radiation from the radiation source 2 on at least the first optical path 5 to the first detector element 3. In this case, the first optical path 5 starts at the radiation source 2 and then reaches the first concave mirror element 13. From the first concave mirror element 13, the electromagnetic radiation is reflected onto the first mirror element 11. The first mirror element 11 reflects the electromagnetic radiation further onto the second mirror element 12 and from there onto the second concave mirror element 14. The second concave mirror element 14 reflects the radiation into the first detector element 3. In this case, the electromagnetic radiation will pass through the measuring chamber 7 five times. In this case, the first optical path 5 intersects itself six times at the points of intersection 6.

Because the electromagnetic radiation on the first optical path 5 passes through the measuring chamber five times, it is possible to detect a weakly absorbing gas, for example, methane, with the first detector element 3.

Figure 1C:
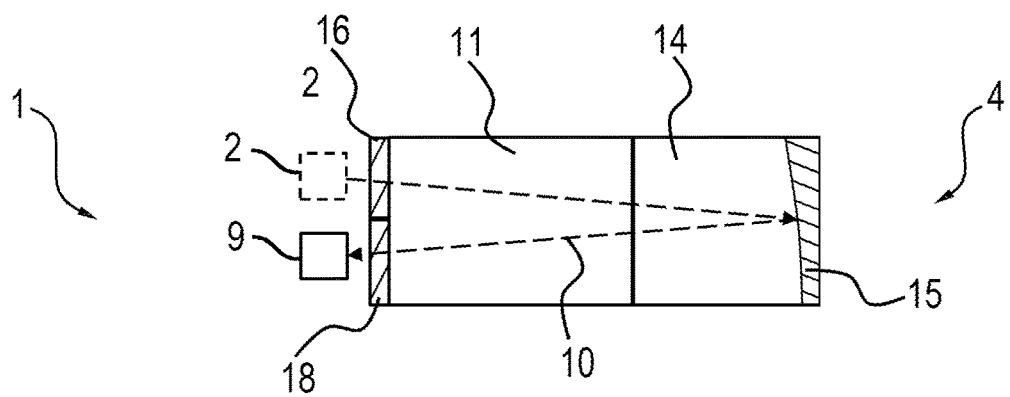
FIG. 1c is a schematic sectional view of the first embodiment of the measuring device with the wall element omitted.

The third concave mirror element 15 is configured and arranged such that it images the radiation source 2 onto the second detector element 9, i.e., electromagnetic radiation is reflected on a second optical path 10 from the radiation source 2 via the concave mirror element 15 onto the second detector element 9, and the second optical path 10 does not intersect with itself in this exemplary embodiment. The second detector element 9 is arranged outside of the first plane. This can be achieved, for example, by the third concave mirror element 15 having an asymmetric configuration, as shown in FIG. 1c, and/or being arranged and directed sloped towards the first plane. For the sake of clarity, the first optical path 5, the first detector element 3 and the transparent element 17 are not shown in FIG. 1c.

Because the second detector element 9 is arranged outside of the first plane, which is defined by the radiation source 2 and two points of intersection 6 of the first optical path 5, a greater flexibility is obtained in the arrangement of the detectors elements 3, 9 and the radiation source 2 especially on a common circuit board. This supports a compact construction of the measuring device, especially when more than two detector elements 3, 9 are used. For example, a third detector element can be arranged in the first plane together with the first detector element 3 and the radiation source 2. The second detector element and the third detector element can then be selectively used for reference measurements. In addition, this arrangement of the second detector element 9 makes possible a clear separation of the detector elements, so that the detector element in question is easily accessible during maintenance or in the event of a defect.

In an embodiment, not shown, the second optical path is fixed such that it will pass through the measuring chamber 7 multiple times and the second optical path intersects with itself. Additional mirror elements and concave mirror elements are arranged for this between the first mirror element 11 and the second concave mirror element 14 and/or between the second mirror element 12 and the first concave mirror element 13 and/or between the transparent element 17 and the first optical filter element 16 and/or the second optical filter element 18. If the second optical path passes through the measuring chamber 7 multiple times as well and possibly intersects with itself as a result, another weakly absorbing gas can also be detected with a very compact measuring device by means of the second detector element 9.

The mirror elements 11, 12 have a flat configuration in the embodiment shown. In an alternative embodiment, not shown, the mirror elements 11, 12, have a radius of curvature that is preferably less than zero, so that the mirror elements 11, 12 have a concave configuration. As a result, a divergence of the electromagnetic radiation can be counteracted.

Further, the electromagnetic radiation, which is emitted by the radiation source 2, can first reach one of the mirror elements 11, 12. The reflector array 4 can be configured in this case such that this electromagnetic radiation does not reach the detector element 3. As an alternative, the reflector array 4 may be configured such that this electromagnetic radiation also reaches the detector element 3 on another optical path, not shown.

The optical paths 5, 10 may, of course, also run differently than shown in the figures, and in case of the second optical path 10, the radiation, which directly reaches the third concave mirror element 15 from the radiation source 2, defines the area, in which the second optical path 10 must run. Correspondingly, the first optical path 5 may only run outside of this area from the radiation source 2.

The second detector element 9 may also be arranged directly adjoining the first detector element 3. In this case, the first detector element 3 and the second detector element 9 may be combined into one piece on a common detector. In this case, the second concave mirror element 14 and the third concave mirror element 15 focus the electromagnetic radiation onto different areas of the common detector.

Figure 2A:
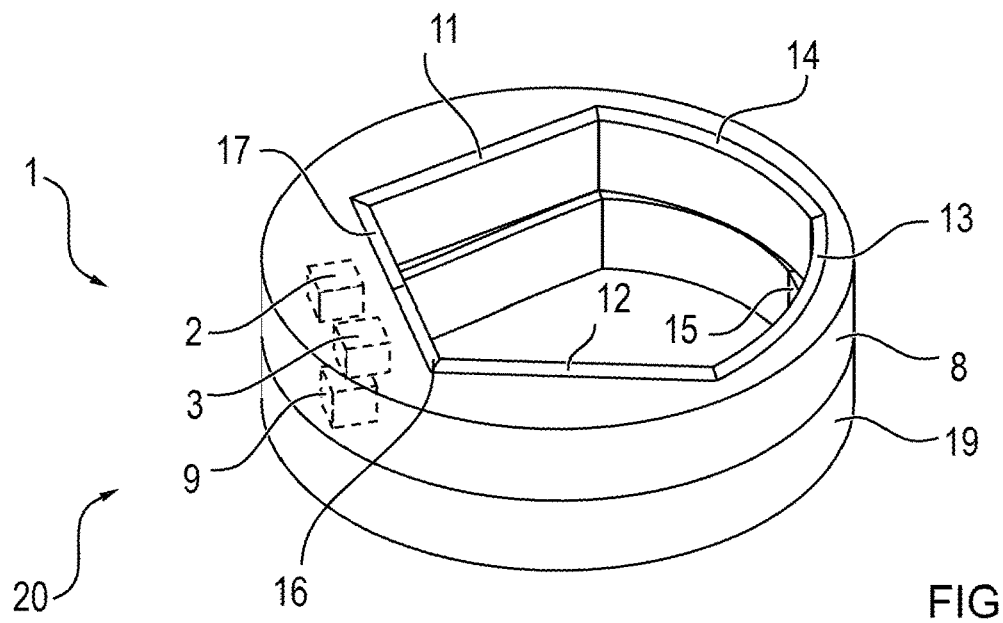
FIG. 2a is a schematic perspective view of a second embodiment of a measuring device for measuring the absorption of at least one weakly absorbing gas and at least one strongly absorbing gas.
Figure 2B:
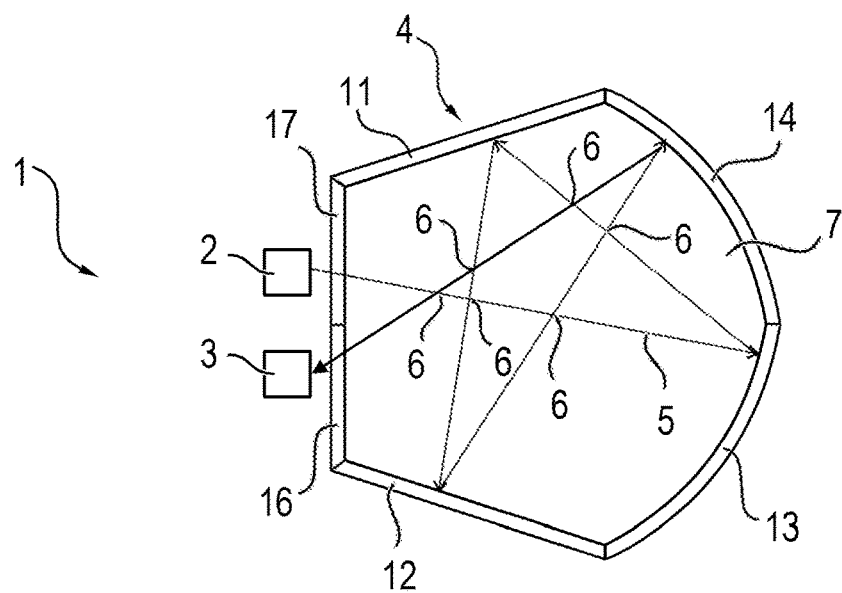
FIG. 2b is a schematic top view of the second embodiment of the measuring device with the wall element omitted.
Figure 2C:
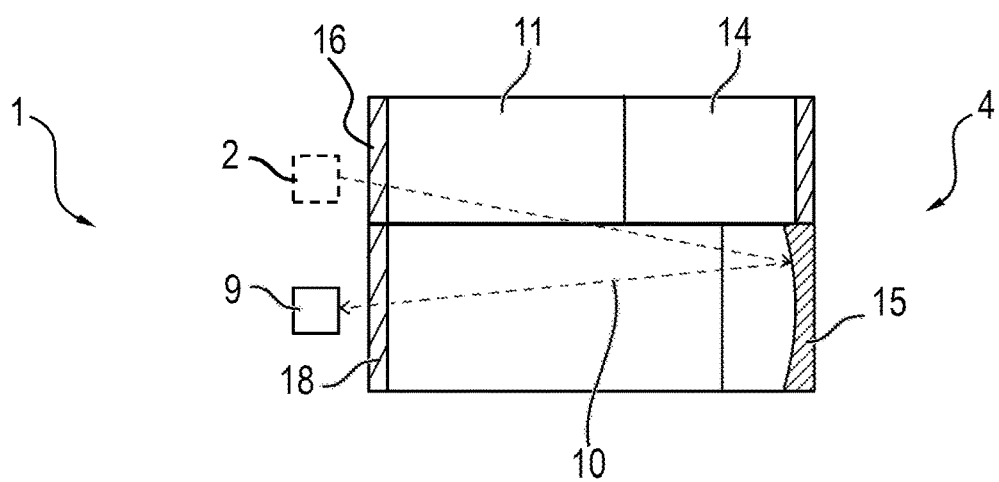
FIG. 2c is a schematic sectional view of the second embodiment of the measuring device with the wall element omitted.

FIGS. 2a, 2b and 2c show an alternative embodiment, with which it is possible to analyze a weakly absorbing gas and a strongly absorbing gas. In this case, the part of the measuring device 1 shown at the top of both FIGS. 2a and 2c corresponds to the arrangement of the components in the first plane according to FIGS. 1a, 1b and 1c, with the omission of the third concave mirror element 15. In this case, the arrangement modified in this manner defines a first measuring plane with a first measured volume, which has a pentagonal cross section. As explained before on the basis of FIGS. 1a, 1b and 1c and shown in FIG. 2b, electromagnetic radiation on a first optical path 5 in the first measuring plane reaches the first detector 3 and a weakly absorbing gas can be detected. For the sake of clarity, the second optical path 10, the second detector element 9 and the third concave mirror element 15 are not shown in FIG. 2b.

A second measuring plane with a second measured volume is arranged below the first measuring plane. The second measuring plane passes through the second detector element 9, the second optical filter element 18 as well as the third concave mirror element 15. For the sake of clarity, the second optical filter element is not shown in FIGS. 2a and 2b.

According to FIGS. 2a, 2b and 2c, in relation to the cross section of the measuring device, a common plane does not pass trough the second detector element 9 and the radiation source 2, the points of intersection 6 and possibly the first detector element 3.

FIG. 2c shows the second optical path 10. In this case, the electromagnetic radiation is irradiated from the radiation source 2 through the first measuring plane onto the third concave mirror element 15, which is arranged in the second measuring plane, and from there is focused onto the second detector element 9. For the sake of clarity, the first optical path 5, the first detector element 3 and the transparent element 17 are not shown in FIG. 2c.

A measuring device with a first measuring plane according to FIGS. 2a, 2b and 2c can be manufactured as a separate component and be operated without an expansion module 19. The expansion module 19 can, if necessary, be connected to this measuring device. In this case, the measuring device and the expansion module 19 form a system 20 for measuring the absorption of gases. The first, second and third concave mirror elements 13, 14, 15 are arranged in a triangle in this modular configuration.

An example of the measurement of two gases with different absorption properties may be, for example, the simultaneous measurement of methane and carbon dioxide. Methane absorbs infrared radiation only weakly. Therefore, methane must be measured by means of the longer first optical path 5. By contrast, carbon dioxide absorbs markedly more infrared radiation, so that carbon dioxide is measured by means of the shorter second optical path 10.

The detector elements 3, 9 can carry out a reference measurement for the respective other detector element 3, 9. When the two gases to be measured have different absorption wavelengths, the reference measurement can be carried out in an especially simple manner in this way.

As an alternative or in addition, in an embodiment, not shown, the third concave mirror element 15 in FIGS. 1a, 1b and 1c is replaced by two concave mirror elements lying one above the other. Here, one of these concave mirror elements images the radiation of the radiation source onto the second detector element as explained before on the basis of FIGS. 1a, 1b and 1c, while the other concave mirror element images the radiation onto an additional fourth detector element, which is preferably arranged in the first plane, but, obviously, may also be arranged above the first plane, and is used, for example, as a detector for reference measurement.

In this way, the measuring device, configured as a multireflection cell, can be manufactured and operated with markedly fewer components and thus in a markedly more effective manner.

While specific embodiments of the invention have been shown and described in detail to illustrate the application of the principles of the invention, it will be understood that the invention may be embodied otherwise without departing from such principles.

What is claimed is:

1. A measuring device for measuring the absorption of gases, the measuring device comprising:
    a radiation source;
    a first detector element;
    a second detector element; and
    a reflector array, the reflector array defining a first optical path between the radiation source and the first detector element and the reflector array defining a second optical path between the radiation source and the second detector element, the first optical path and the second optical path being located in different planes, wherein the first optical path has at least two points of intersection with itself, the first plane being defined by the radiation source and the at least two points of intersection of the first optical path, the second detector element being arranged outside of the first plane, the same radiation source being configured to emit at least a first beam of radiation along the first optical path such the beam of radiation intersects itself at least twice, wherein the second optical path has no point of intersection with itself, the same radiation source being configured to emit at least a second beam along the second optical path such the second beam has no point of intersection with itself.

2. A measuring device in accordance with claim 1, wherein the first optical path has at least three points of intersection with itself in only the one of the planes.

3. A measuring device in accordance with claim 1, further comprising a wall element enclosing a measuring chamber, wherein the radiation source, the first detector element and the reflector array are arranged at the wall element on one side of the reflector array.

4. A measuring device in accordance with claim 3, wherein the wall element extends in the one of the planes, in which the first optical path has a pentagonal or hexagonal cross section.

5. A measuring device in accordance with claim 1, wherein:
    the reflector array has a first mirror element and a second mirror element as well as a first concave mirror element and a second concave mirror element for the first optical path;
    a focus of the reflector array is located on the radiation source and another focus of the reflector array is located on the first detector element; and
    the concave mirror elements are parabolic.

6. A measuring device in accordance with claim 5, wherein the reflector array comprises in the second optical path a third concave mirror element, which images the radiation source onto the second detector element.

7. A measuring device in accordance with claim 6, wherein the third concave mirror element is arranged between the first concave mirror element and the second concave mirror element.

8. A measuring device in accordance with claim 6, wherein the third concave mirror element, the first concave mirror element and the second concave mirror element are arranged in a triangle.

9. A measuring device in accordance with claim 1, wherein an optical filter element is arranged between the measuring chamber and the first detector element or between the measuring chamber and the second detector element or between the measuring chamber and the first detector element and the second detector element.

10. A measuring device in accordance with claim 1, wherein the reflector array has a first mirror element, a second mirror element, a first concave mirror element and a second concave mirror element, the first mirror element, the second mirror element, the first concave mirror element and the second concave mirror element defining at least a portion of the first optical path, the first mirror element having a first mirror element portion located adjacent to the first concave mirror element, the second mirror element having a second mirror element portion located adjacent to the second concave mirror element.

11. A gas absorption measuring device comprising:
    a reflector array at least partially defining a measuring space;
    a radiation source;
    a first detector element; and
    a second detector element, wherein:
    the reflector array is configured in cooperation with a position of the radiation source and the first detector element to define a first optical path in a first plane within the measuring space, between the radiation source and the first detector element, with the first optical path intersecting the first optical path at least at two points;
    the first plane is defined by at least the radiation source and the at least two points of intersection;
    the reflector array is configured in cooperation with the position of the radiation source and a position of the second detector element to define a second optical path in a second plane;
    the second plane is different from the first plane;
    the position of the second detector element is outside of the first plane;
    the same radiation source is configured to emit at least a beam of radiation along the first optical path such the beam of radiation intersects itself at least twice;
    the second optical path has no point of intersection with itself; and
    the same radiation source is configured to emit at least another beam along the second optical path such that the another beam has no point of intersection with itself.

12. A gas absorption measuring device in accordance with claim 11, wherein the first optical path intersects the first optical path at least at three points in the first plane.

13. A gas absorption measuring device in accordance with claim 11, further comprising:
- an optical filter element arranged along the first optical path upstream of the first detector element and downstream of the measuring space; or
- an optical filter element arranged along the second optical path upstream of the first detector element and downstream of the measuring space; or
- an optical filter element arranged along the first optical path upstream of the first detector element and downstream of the measuring space and an optical filter element arranged along the second optical path upstream of the first detector element and downstream of the measuring space; or
- an optical filter element arranged along the first optical path upstream of the first detector element and downstream of the measuring space and arranged along the second optical path upstream of the first detector element and downstream of the measuring space.

14. A gas absorption measuring device in accordance with claim 11, further comprising a wall element enclosing a measuring chamber, wherein the radiation source, the first detector element and the reflector array are arranged at the wall element on one side of the reflector array.

15. A gas absorption measuring device in accordance with claim 14, wherein the wall element has an essentially pentagonal or hexagonal cross section.

16. A gas absorption measuring device in accordance with claim 11, wherein:
- the reflector array comprises a first mirror element and a second mirror element, a first concave mirror element and a second concave mirror element configured to at least partially define the first optical path;
- a focus of the reflector array is located on the radiation source;
- another focus of the reflector array is located on the first detector element;
- the first concave mirror element is parabolic; and
- the second concave mirror element is parabolic.

17. A gas absorption measuring device in accordance with claim 16, wherein the reflector array further comprises a third concave mirror element, which images the radiation source onto the second detector element and defines the second optical path.

18. A gas absorption measuring device in accordance with claim 17, wherein the third concave mirror element is arranged between the first concave mirror element and the second concave mirror element.

19. A gas absorption measuring device in accordance with claim 17, wherein the third concave mirror element, the first concave mirror element and the second concave mirror element are arranged in a triangle.

20. A gas absorption measuring device in accordance with claim 11, wherein the reflector array has a first mirror element, a second mirror element, a first concave mirror element and a second concave mirror element, the first mirror element, the second mirror element, the first concave mirror element and the second concave mirror element defining at least a portion of the first optical path, the first mirror element having a first mirror element portion located adjacent to the first concave mirror element, the second mirror element having a second mirror element portion located adjacent to the second concave mirror element.

* * * * *